US011814253B2

(12) United States Patent
Baker et al.

(10) Patent No.: US 11,814,253 B2
(45) Date of Patent: Nov. 14, 2023

(54) FURNITURE HANDLING STRAP (71) Applicant: La-Z-Boy Incorporated, Monroe, MI (US)

(72) Inventors: Jason M. Baker, Ooltewah, TN (US); Jason D. Rains, Evensville, TN (US)

(73) Assignee: La-Z-Boy Incorporated, Monroe, MI (US)

(*) Notice: Subject to any disclaimer, the term of this patent is extended or adjusted under 35 U.S.C. 154(b) by 0 days.

(21) Appl. No.: 17/456,111

(22) Filed: Nov. 22, 2021

(65) Prior Publication Data
US 2022/0162003 A1    May 26, 2022

Related U.S. Application Data (60) Provisional application No. 63/117,055, filed on Nov. 23, 2020.

(51) Int. Cl.
*B65G 7/12*    (2006.01)
*A45F 3/14*    (2006.01)

(52) U.S. Cl.
CPC .............. *B65G 7/12* (2013.01); *A45F 3/14* (2013.01); *A45F 2003/142* (2013.01)

(58) Field of Classification Search
CPC ................................... B65G 7/12; A45F 3/14
USPC ....................................................... 224/184
See application file for complete search history.

(56) References Cited

U.S. PATENT DOCUMENTS

| 1,935,339 | A | * | 11/1933 | Tricau | .................... | B64D 17/36 |
| | | | | | | 297/472 |
| 2,431,780 | A | * | 12/1947 | Theal | ........................ | A45F 3/14 |
| | | | | | | 224/157 |
| 2,651,441 | A | * | 9/1953 | Rau | ........................... | A45F 3/14 |
| | | | | | | 224/264 |

(Continued)

FOREIGN PATENT DOCUMENTS

| DE | 102008003104 A1 | 7/2009 |
| DE | 202013105177 U1 | 2/2015 |

(Continued)

OTHER PUBLICATIONS

International Search Report and Written Opinion for PCT/US2021/060565 dated Mar. 21, 2022.

*Primary Examiner* — Nathan J Newhouse
*Assistant Examiner* — Lester L Vanterpool
(74) *Attorney, Agent, or Firm* — Harness, Dickey & Pierce, P.L.C.

(57) ABSTRACT

A furniture handling strap assembly may be used to aid in lifting and carrying a furniture item such as a chair, sofa, or loveseat, for example. The handling strap assembly may include a strap, a bracket, and a fastener. The strap may include a first handling loop and a second handling loop. The first and second handling loops may be flexible. The bracket may be attached to the strap. The fastener may be configured to be received through an aperture in the bracket and may engage the furniture item. A person may insert his/her hand through one or both of the handling loops and gasp a portion of the strap. The person may use his/her other hand to support and stabilize the furniture member as the person lifts the furniture item. Another person may assist in lifting the furniture item using another one of the handling strap assemblies.

14 Claims, 8 Drawing Sheets

(56) References Cited

U.S. PATENT DOCUMENTS

| | | | | |
|---|---|---|---|---|
| 4,220,328 A * | 9/1980 | Crush, Jr. | ............... | A63B 21/28 |
| | | | | 482/92 |
| 4,431,226 A * | 2/1984 | Weilert | ................. | A47C 31/08 |
| | | | | 294/152 |
| 4,953,904 A * | 9/1990 | Danboise | ................. | B65G 7/12 |
| | | | | 294/26 |
| 5,102,178 A * | 4/1992 | Staats, Jr. | ................. | A45F 3/14 |
| | | | | 294/157 |
| 5,184,862 A * | 2/1993 | Theobald | ................. | B65G 7/12 |
| | | | | 294/137 |
| 5,503,448 A * | 4/1996 | Dewey | ................... | B65G 7/12 |
| | | | | 294/157 |
| 5,688,011 A * | 11/1997 | Gulley | ..................... | B66C 1/18 |
| | | | | 294/74 |
| 5,848,667 A * | 12/1998 | Davidson | ................ | B63B 27/14 |
| | | | | 182/196 |
| 5,863,056 A * | 1/1999 | Hostetter | ............... | A47C 31/08 |
| | | | | 294/157 |
| 5,997,494 A * | 12/1999 | Watkins | ............... | A61H 1/0218 |
| | | | | 602/32 |
| D418,301 S * | 1/2000 | Anderson | ..................... | D3/327 |
| 6,039,376 A * | 3/2000 | Lopreiato | ................ | B65G 7/12 |
| | | | | 294/157 |
| 6,357,551 B1 * | 3/2002 | Bogardus, III | ........... | E06C 1/56 |
| | | | | 182/196 |
| 6,508,389 B1 * | 1/2003 | Ripoyla | .................... | A45F 3/14 |
| | | | | 224/262 |
| 6,637,077 B2 * | 10/2003 | Doty | ..................... | B60P 7/0823 |
| | | | | 24/298 |
| 6,641,008 B2 * | 11/2003 | Falzone | .................... | A45F 3/14 |
| | | | | 224/259 |
| D508,323 S * | 8/2005 | Douglas | ......................... | D3/328 |
| 7,077,447 B1 * | 7/2006 | Betway | .................... | B65G 7/12 |
| | | | | 294/157 |
| 7,731,069 B2 * | 6/2010 | Lopreiato | ................ | B65G 7/12 |
| | | | | 224/267 |
| 7,926,860 B2 * | 4/2011 | Hill | ........................... | A45F 3/14 |
| | | | | 294/167 |
| D666,896 S * | 9/2012 | Pinholster, Jr. | ................. | D8/356 |
| 8,292,341 B1 * | 10/2012 | Sokoly | ................ | A01M 31/006 |
| | | | | 224/184 |
| 8,343,018 B2 * | 1/2013 | Moulton | .............. | A63B 23/035 |
| | | | | 482/131 |
| 8,459,710 B1 * | 6/2013 | White | ...................... | B65G 7/12 |
| | | | | 294/152 |
| 8,678,254 B2 * | 3/2014 | Murphy | .................... | A45F 5/02 |
| | | | | 224/157 |
| 8,807,403 B2 * | 8/2014 | Nielsen | .................... | A45F 3/14 |
| | | | | 24/171 |
| 9,320,343 B1 * | 4/2016 | Pinholster, Jr. | ........... | A45F 3/22 |
| 9,596,922 B2 * | 3/2017 | Nielsen | ................ | A45F 3/14 |
| 9,930,955 B2 | 4/2018 | Nielsen | | |
| 10,245,460 B2 * | 4/2019 | Hetrick | .............. | A63B 21/4035 |
| D891,723 S | 7/2020 | Nielsen | | |
| 10,912,374 B2 * | 2/2021 | Hopple | ................ | A45F 5/1046 |
| 11,388,971 B2 * | 7/2022 | Lavoie | .................. | A45F 5/12 |
| 2002/0148866 A1 * | 10/2002 | Dent, III | ................... | A45F 3/14 |
| | | | | 224/259 |
| 2003/0111857 A1 * | 6/2003 | Freeland | .................. | B65G 7/12 |
| | | | | 294/152 |
| 2005/0103813 A1 | 5/2005 | Edwards | | |
| 2005/0103818 A1 * | 5/2005 | Gretsch | .............. | B65H 23/1888 |
| | | | | 226/24 |
| 2006/0080782 A1 | 4/2006 | Mallory | | |
| 2007/0131726 A1 * | 6/2007 | Aliev | ......................... | A45F 3/14 |
| | | | | 224/257 |
| 2008/0083795 A1 * | 4/2008 | Lopreiato | ................ | B65G 7/12 |
| | | | | 224/157 |
| 2009/0094743 A1 | 4/2009 | Tanaka et al. | | |
| 2009/0140019 A1 * | 6/2009 | Martinich | ................. | A45F 3/14 |
| | | | | 414/800 |
| 2010/0025445 A1 * | 2/2010 | Brunson | .................. | B65G 7/12 |
| | | | | 224/264 |
| 2010/0140970 A1 * | 6/2010 | Vrynois | ................ | B65G 7/12 |
| | | | | 294/152 |
| 2010/0181793 A1 * | 7/2010 | Lopreiato | ................ | B65G 7/12 |
| | | | | 294/152 |
| 2013/0221047 A1 * | 8/2013 | Johnson | .................. | A45F 5/021 |
| | | | | 224/463 |
| 2016/0022053 A1 | 1/2016 | Martin | | |
| 2017/0127808 A1 * | 5/2017 | Conlin | ................... | D03D 3/005 |
| 2020/0115162 A1 * | 4/2020 | Kreitzer | ................. | B65G 7/12 |

FOREIGN PATENT DOCUMENTS

| | | |
|---|---|---|
| EP | 3202280 A1 | 8/2017 |
| EP | 3616569 A1 | 3/2020 |
| IT | 1391283 B1 | 12/2011 |
| KR | 200449605 Y1 | 7/2010 |
| WO | WO-02065874 A1 | 8/2002 |

\* cited by examiner

FURNITURE HANDLING STRAP

CROSS-REFERENCE TO RELATED APPLICATIONS

This application claims the benefit of U.S. Provisional Application No. 63/117,055 filed on Nov. 23, 2020. The entire disclosure of the above application is incorporated herein by reference.

FIELD

The present disclosure relates to a handling strap assembly for lifting and carrying a furniture item.

BACKGROUND

This section provides background information related to the present disclosure and is not necessarily prior art.

Furniture items, such as chairs, sofas, loveseats, etc., are often difficult to lift and carry due to their size, shape, and/or weight. Many furniture items lack convenient surfaces to grip, which can make lifting and carrying the furniture item awkward or impractical even for two people lifting together. The present disclosure provides a handling strap assembly and method that allow a furniture item to be easily and conveniently lifted and carried to a desired location.

SUMMARY

This section provides a general summary of the disclosure and is not a comprehensive disclosure of its full scope or all of its features.

In one form, the present disclosure provides a furniture handling strap assembly that may include a strap, a bracket, and a fastener. The strap may include a first handling loop and a second handling loop. The first and second handling loops may be flexible. The bracket may be attached to the strap. The fastener may be configured to be received through an aperture in the bracket.

In some configurations of the furniture handling strap assembly of the above paragraph, the second handling loop extends further away from the bracket than the first handling loop.

In some configurations of the furniture handling strap assembly of either of the above paragraphs, the first and second handling loops extend parallel to each other.

In some configurations of the furniture handling strap assembly of any one or more of the above paragraphs, the first and second handling loops are attached to each other by a stitching.

In some configurations of the furniture handling strap assembly of any one or more of the above paragraphs, the first and second handling loops both extend from the stitching in a first direction.

In some configurations of the furniture handling strap assembly of any one or more of the above paragraphs, the strap includes a bracket loop attached to the bracket.

In some configurations of the furniture handling strap assembly of any one or more of the above paragraphs, the bracket loop extends from the stitching in a second direction that is opposite the first direction.

In some configurations of the furniture handling strap assembly of any one or more of the above paragraphs, the fastener includes a head and a threaded shaft.

In some configurations of the furniture handling strap assembly of the above paragraph, the threaded shaft may be configured to threadably engage a threaded aperture in a furniture item.

In some configurations of the furniture handling strap assembly of any one or more of the above paragraphs, the strap is a webbing of thread.

In some configurations of the furniture handling strap assembly of the above paragraph, the thread is a polyester thread.

In some configurations of the furniture handling strap assembly of any one or more of the above paragraphs, the first and second handling loops and the bracket loop are formed from a single, unitary length of the webbing of thread.

In some configurations of the furniture handling strap assembly of any one or more of the above paragraphs, the bracket is a rigid member including a slot that receives the bracket loop of the strap.

In another form, the present disclosure provides a method of transporting a furniture item. The method may include removing a first foot and a second foot from a first location and a second location, respectively, of an underside of the furniture item; attaching a first handling strap assembly to the first location of the underside of the furniture item; attaching a second handling strap assembly to the second location of the underside of the furniture item; inserting a first hand of a first person through a selected one of first and second handling loops of the first handling strap assembly; inserting a first hand of a second person through a selected one of first and second handling loops of the second handling strap assembly; supporting the furniture item with a second hand of the first person, wherein the second hand of the first person is spaced apart from the first and second handling strap assemblies while supporting the furniture item; supporting the furniture item with a second hand of the second person, wherein the second hand of the second person is spaced apart from the first and second handling strap assemblies while supporting the furniture item; and lifting the furniture item and carrying the furniture item.

In some configurations of the method of the above paragraph, removing the first and second feet from the furniture item includes unscrewing the first and second feet from apertures in the furniture item.

In some configurations of the method of either of the above paragraphs, attaching the first and second handling strap assemblies to the first and second locations includes threadably engaging fasteners of the first and second handling strap assemblies into the apertures at the first and second locations of the furniture item.

In some configurations of the method of any one or more of the above paragraphs, the first and second handling strap assemblies each include a bracket through which the fasteners extend.

In some configurations of the method of any one or more of the above paragraphs, the second handling loop extends further away from the bracket than the first handling loop.

In some configurations of the method of any one or more of the above paragraphs, the first and second handling loops extend parallel to each other.

In some configurations of the method of any one or more of the above paragraphs, the first and second handling loops are formed from a webbing of thread.

In some configurations of the method of the above paragraph, the thread is a polyester thread.

In some configurations of the method of any one or more of the above paragraphs, the first and second handling loops and the bracket loop are formed from a single, unitary length of the webbing of thread.

In some configurations of the method of any one or more of the above paragraphs, the first and second handling loops are attached to each other by a stitching.

In some configurations of the method of any one or more of the above paragraphs, the first and second handling loops both extend from the stitching in a first direction.

In some configurations of the method of any one or more of the above paragraphs, the webbing of thread includes a bracket loop that extends from the stitching in a second direction that is opposite the first direction.

In some configurations of the method of any one or more of the above paragraphs, the bracket loop engages the bracket.

Further areas of applicability of the present disclosure will become apparent from the description, the claims, and the drawings. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicated corresponding parts throughout the several views of the drawings.

DETAILED DESCRIPTION

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, and/or components, but do not preclude the presence or addition of one or more other features, integers, steps, operations, elements, and/or groups thereof. The method steps, processes, and operations described herein are not to be construed as necessarily requiring their performance in the particular order discussed or illustrated, unless specifically identified as an order of performance.

When an element or layer is referred to as being "on," "engaged with," "connected to," or "coupled to" another element or layer, it may be directly on, engaged, connected, or coupled to the other element or layer, or intervening elements or layers may be present. In contrast, when an element is referred to as being "directly on," "directly engaged with," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers, and/or sections, these elements, components, regions, layers, and/or sections should not be limited by these terms. These terms may be only used to distinguish one element, component, region, layer, and/or section from another element, component, region, layer, and/or section. Terms such as "first," "second," and other numerical terms when used herein do not imply a sequence or order unless clearly indicated by the context. Thus, a first element, component, region, layer, or section could be terms a second element, component, region, layer, or section without departing from the teachings of the example embodiment.

Spatially relative terms, such as "inner," "outer," "beneath," "below," "lower," "above," "upper," and the like, may be used herein for ease of description to describe one element or feature's relationship to another element or feature as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented above the other elements or features. Thus, the example term "below" can encompass both an orientation of above and below. The device may be otherwise oriented (rotated 90 degrees or at other orientations) and the spatially relative descriptors used herein interpreted accordingly.

Figure 6:
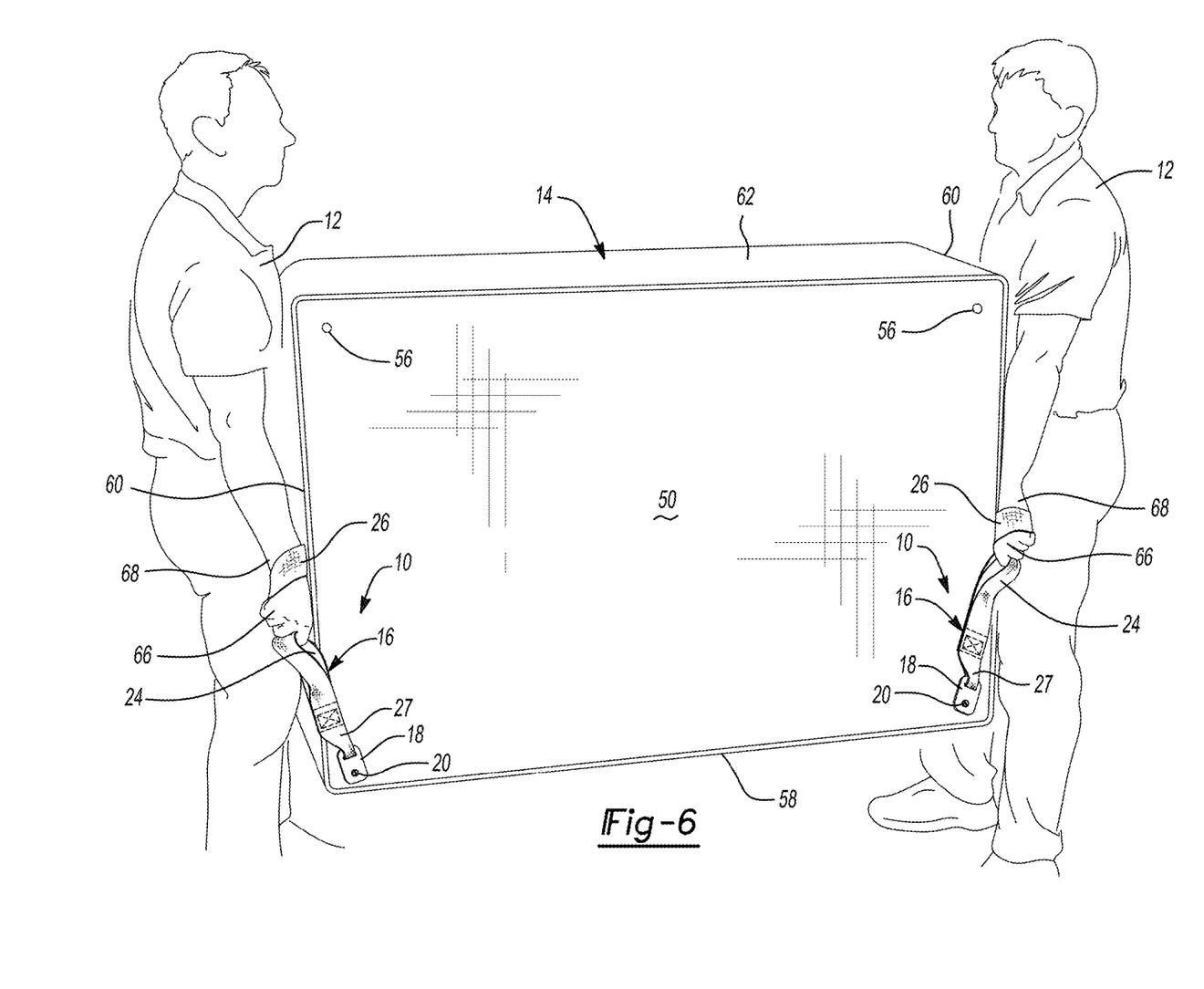
FIG. 6 is a perspective view of people lifting a furniture item using two of the handling strap assemblies.
Figure 7:
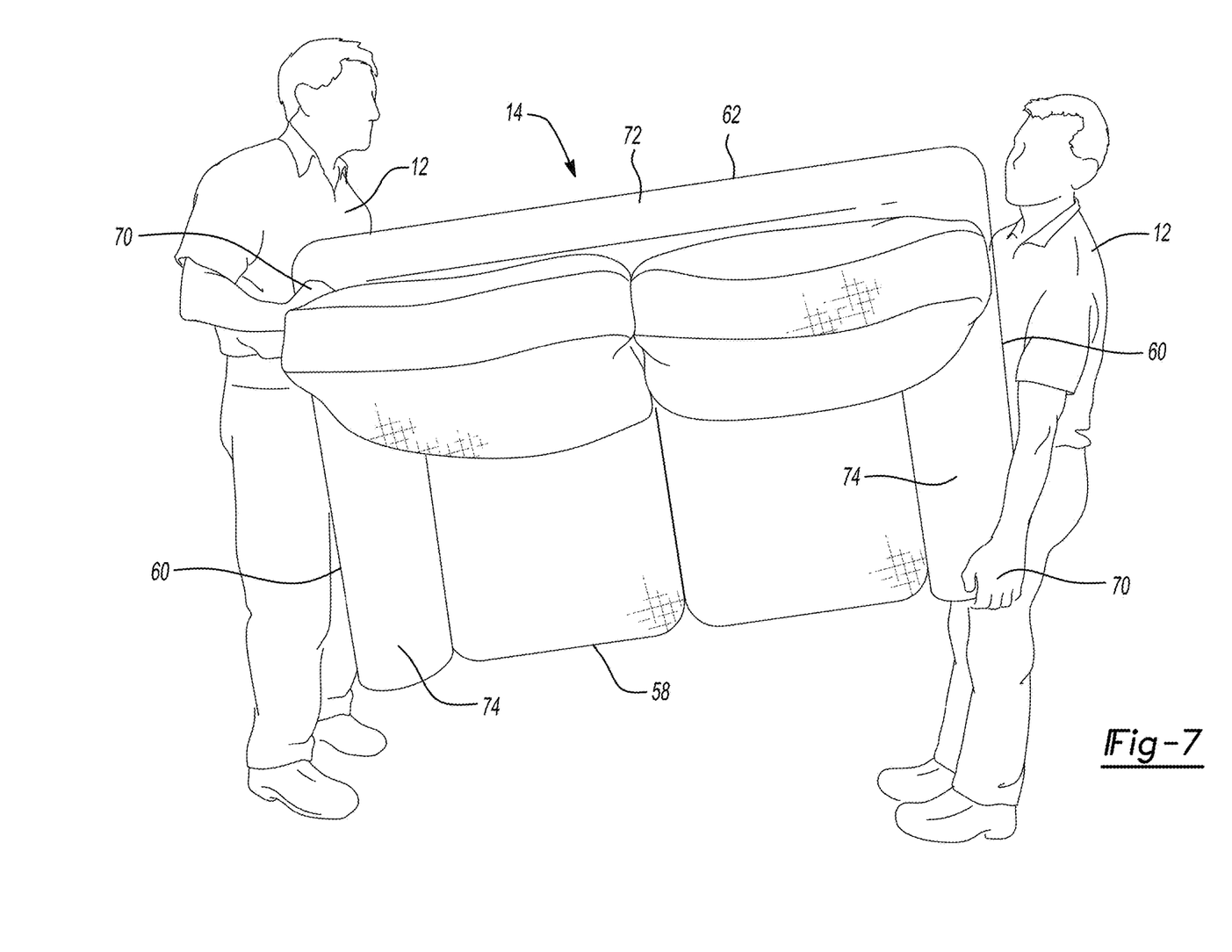
FIG. 7 is another perspective view of the people lifting the furniture item using the handling strap assemblies.

With reference to FIGS. 1-10, a furniture handling strap assembly 10 is provided. As shown in FIGS. 6 and 7, one or more of the handling strap assemblies 10 may be used by one or more persons 12 to lift and carry a furniture item 14 (e.g., a sofa, chair, loveseat, chaise, ottoman, bed frame, etc.) so that the one or more persons 12 can transport the furniture item 14 from a first location to a second location.

As shown in FIGS. 1-5, the handling strap assembly 10 may include a strap 16, a bracket 18, a fastener 20, and a retainer 22. The strap 16 may include at least one handling loop. In the example shown in the figures, the strap 16 includes a first handling loop 24, a second handling loop 26, and a bracket loop 27. The first and second handling loops 24, 26 may be woven, braided, twisted, sewn, and/or otherwise formed from one or more flexible filaments, threads, or fibers, for example. In some examples, the first and second handling loops 24, 26 may be low-stretch polyester webbings formed from polyester multifilament thread, such as PREMOBOND thread manufactured by Fil-Tec, for example.

Figure 1:
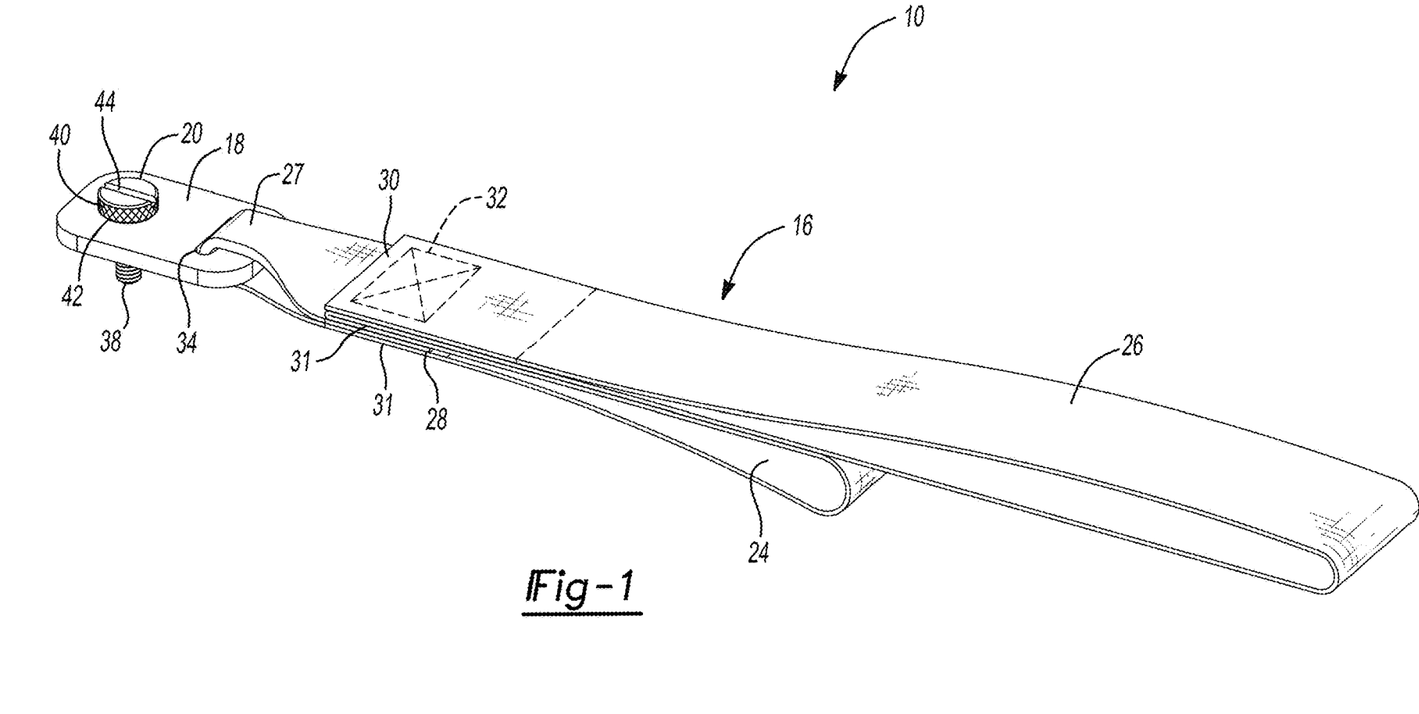
FIG. 1 is a perspective view of a handling strap assembly according to the principles of the present disclosure.

In some configurations, the first and second handling loops 24, 26 may be two distinct loops of strap material (e.g., webbing) that are sewn, stitched, bonded and/or otherwise fixed together. In the example shown in the figures, the first and second handling loops 24, 26 and the bracket loop 27 are formed from a single, unitary length of strap material (e.g., webbing). As shown in FIGS. 1 and 3, the single, unitary length of strap material may include a first end 28 and a second end 30. The first and second ends 28, 30 and a plurality of intermediate portions 31 of the strap may be stacked atop each other and stitched together via stitching 32 (FIGS. 1 and 2), thereby forming the first and second handling loops 24, 26 and the bracket loop 27. The first and second handling loops 24, 26 may have a width W that is sized so that the handling loops 24, 26 do not dig into a person's flesh while the person's hand and/or forearm is inserted through one or both handling loops 24, 26. For example, the width W may be about two inches. In some configurations, the strap 16 may include only a single handling loop or more than two handling loops.

Figure 2:
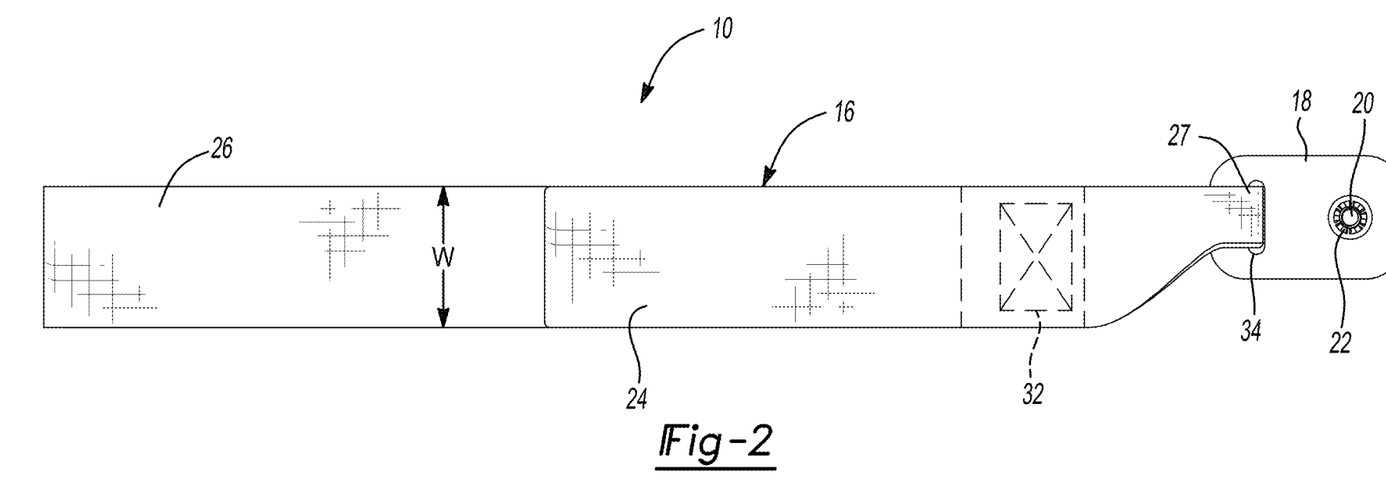
FIG. 2 is a bottom view of the handling strap assembly.
Figure 3:
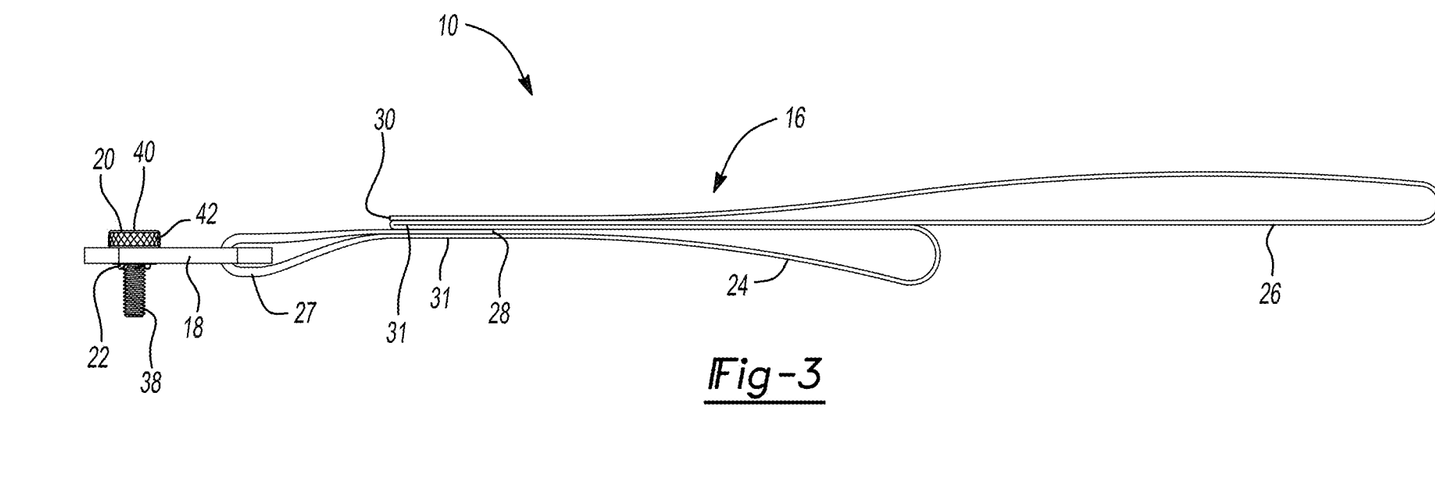
FIG. 3 is a side view of the handling strap assembly.

As shown in FIGS. 1-3, the bracket loop 27 may extend from the stitching 32 (or from the first end 28) in a first direction, and the first and second handling loops 24, 26 may extend from the stitching 32 in a second direction opposite the first direction. The first handling loop 24 may extend a first distance from the stitching 32 in the second direction, and the second handling loop 26 may extend a second distance from the stitching 32 in the second direction. The second distance may be greater than the first distance. In other words, the second handling loop 26 can extend further from the bracket loop 27 than the first handling loop 24. As shown in the figures, the first and second handling loops 24, 26 may be parallel to each other. The bracket loop 27 may also be parallel to the first and second handling loops 24, 26.

Figures 4, 5:
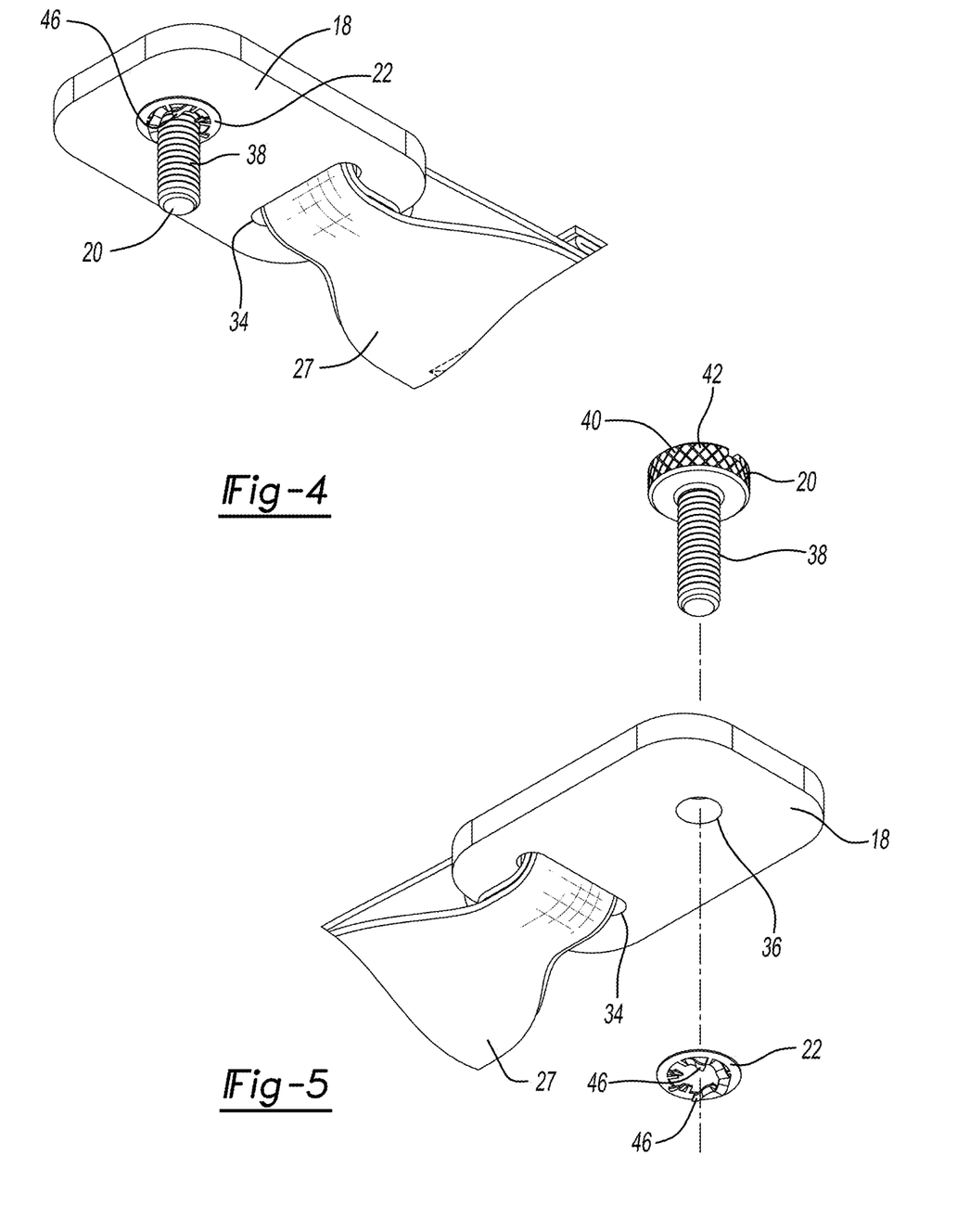
FIG. 4 is a partial perspective view of the handling strap assembly.
FIG. 5 is a partial exploded view of the handling strap assembly.

The bracket 18 may be a rigid plate or block and can be formed from a metallic, polymeric, or composite material, for example. The bracket 18 may include a first aperture 34 and a second aperture 36 (FIG. 5). The first aperture 34 may be a slot sized to allow the bracket loop 27 of the strap 16 to extend therethrough. That is, the first end 28 of the strap 16 may be fed through the first aperture 34 before the strap 16 is stitched (at stitching 32) to form the loops 24, 26, 27. In this manner, the bracket 18 is retained on the bracket loop 27.

The fastener 20 may include a threaded (or at least partially threaded) shaft 38 and a head 40. The head 40 is disposed at one end of the shaft 38. The shaft 38 may extend through the second aperture 36. The second aperture 36 is sized large enough to allow the shaft 38 to be freely inserted therein and small enough to prevent the head 40 from passing through the aperture 36. In some configurations, the fastener 20 may be a thumb screw—i.e., the head 40 may be sized to allow a person to readily grip the head 40 with his/her fingers to manually turn the fastener 20 without the use of any tools. The periphery of the head 40 may including knurling 42, ribs, or other features to improve grip. In some configurations, the head 40 may also include one or more slots 44 (FIG. 1) and/or a socket to accommodate a screwdriver or wrench.

As shown in FIGS. 4 and 5, the retainer 22 may be a push ring having a plurality of radially inwardly extending tabs 46 that engage the shaft 38 of the fastener 20. The tabs 46 may be resiliently flexible. With the shaft 38 inserted through the second aperture 36, the tabs 46 can be pressed or threaded onto the shaft 38 and may engage the threads of the shaft 38 (i.e., with the bracket 18 disposed between the head 40 and the retainer 22). In this manner, the retainer 22 prevents the fastener 20 from inadvertently falling out of the second aperture 36.

As shown in FIGS. 1-3, the bracket 18 defines a first distal end of the handling strap assembly 10 and a distal end of the second handling loop 26 defines a second distal end of the handling strap assembly 10. A distal end of the first handling strap 24 is disposed between the second distal end of the handling strap assembly 10 and the bracket 18. The entire first handling loop 24 is disposed between the distal end of the second handling loop 26 and the bracket 18.

Referring now to FIGS. 6-10, a method of lifting the furniture item 14 using the handling strap assemblies 10 will be described. For example, as shown in FIG. 6, a pair of handling strap assemblies 10 can be attached to the furniture item 14, and the people 12 can utilize the handling strap assemblies 10 to more easily lift the furniture item 14 so that the people 12 can more easily carry the furniture item 14 to a desired location.

Figure 9:
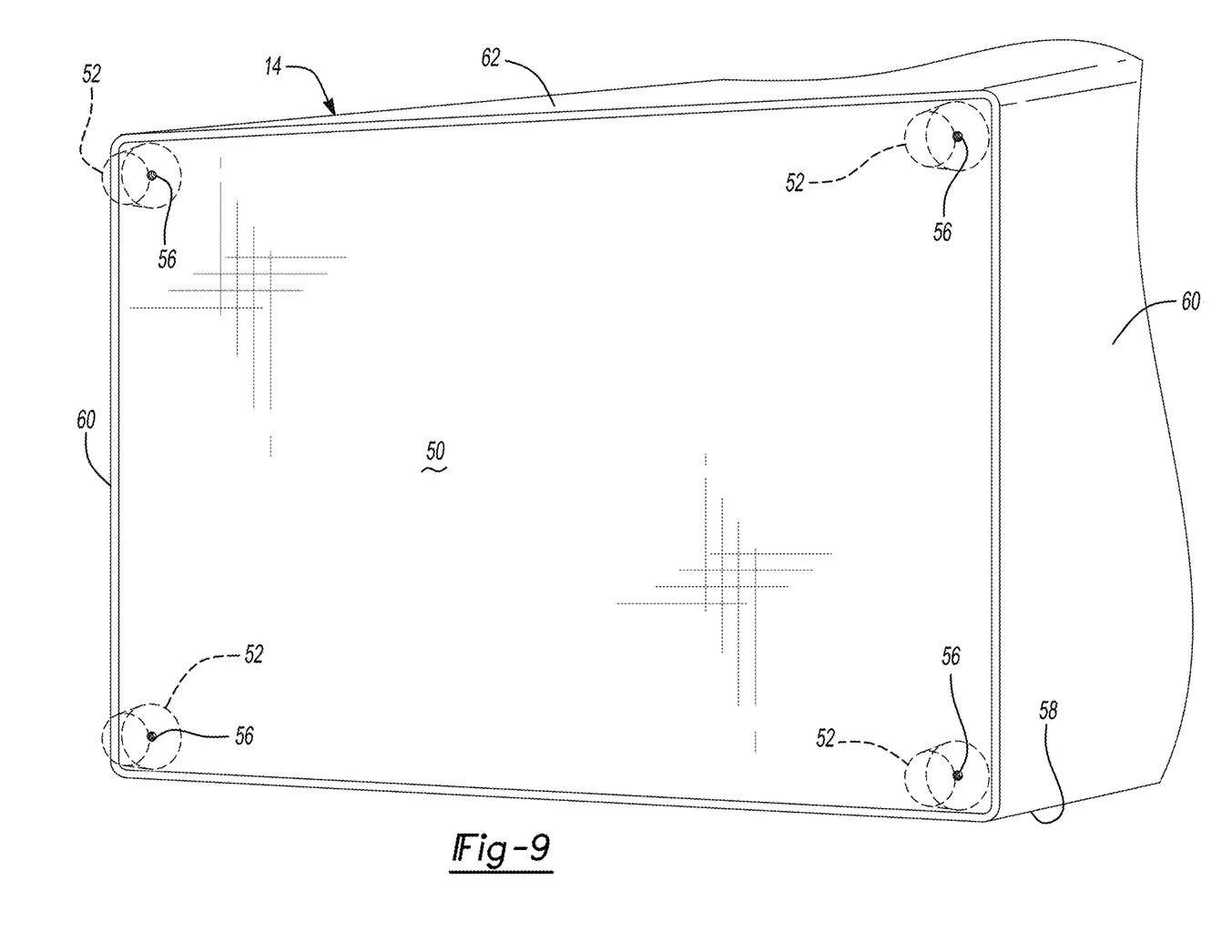
FIG. 9 is a perspective view of the furniture item resting on its front surface.

FIG. 9 shows an underside 50 of the furniture item 14 having a plurality of feet 52 that are threadably fastened to the underside 50. For example, each of the feet 52 may include a threaded shaft (not shown) that can be threadably received in one of a plurality of apertures 56 (e.g., threaded holes) in the underside 50 of the furniture item 14 (i.e., an underside of a frame of the furniture item 14). In some configurations, the apertures 56 may be the threaded holes in T-nuts connected to the frame of the furniture item 14.

During normal use of the furniture item 14 (e.g., when one or more people are sitting on the furniture item 14), the feet 52 are in contact with a floor or ground surface. To attach the handling strap assemblies 10 to the furniture item 14, the furniture item 14 may be placed on its front surface 58 (i.e., with the underside 50 oriented generally perpendicular to the floor; shown in FIG. 9). In this position (or with the furniture item placed on one of its side surfaces 60 or its rear surface 62), some or all of the feet 52 may be removed from the furniture item 14 (see step 110 of FIG. 10). Any desired number of handling strap assemblies 10 may be attached to the furniture item 14 in place of the feet 52.

Figure 10:
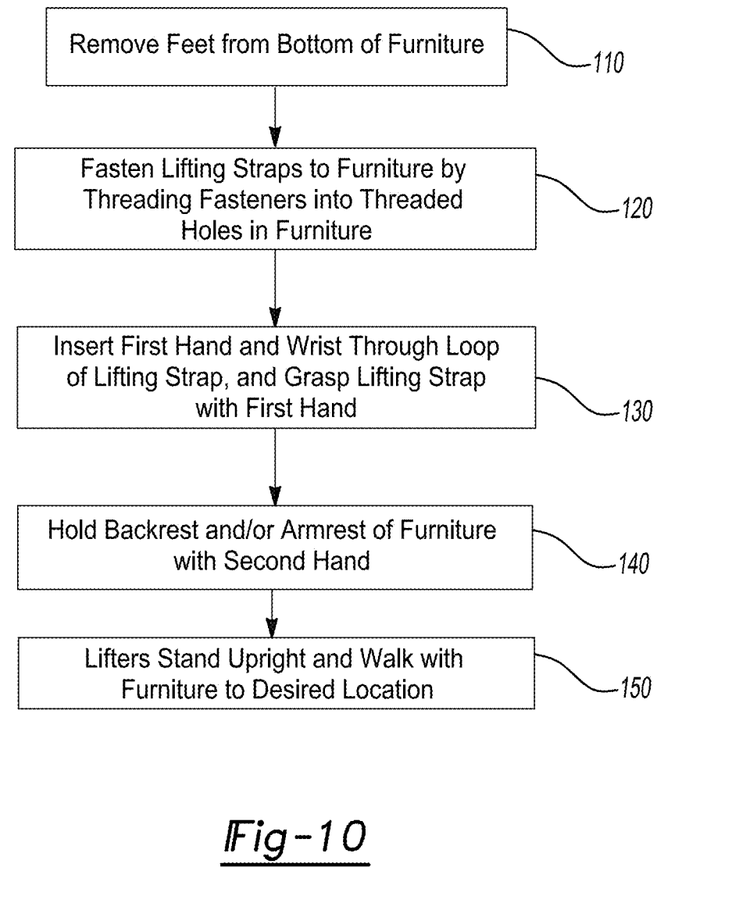
FIG. 10 is a flowchart depicting a method of lifting and carrying the furniture item.

The handling strap assembly 10 may be attached to the furniture item 14 by fastening the bracket 18 to the underside 50 of the furniture item 14 by threading the fastener 20 into a desired aperture 56 in the furniture item 14 (see FIG. 6 and step 120 of FIG. 10). In some circumstances (e.g., depending on the shape and size of the furniture item 10 and how and where the furniture item 10 is to be carried), it may be most beneficial to fasten handling strap assemblies 10 to two of the apertures 56 located closest to the floor when the furniture item 14 is resting on its front surface 58 (as shown in FIG. 6), one of its side surfaces 60, or its rear surface 62.

Figure 8:
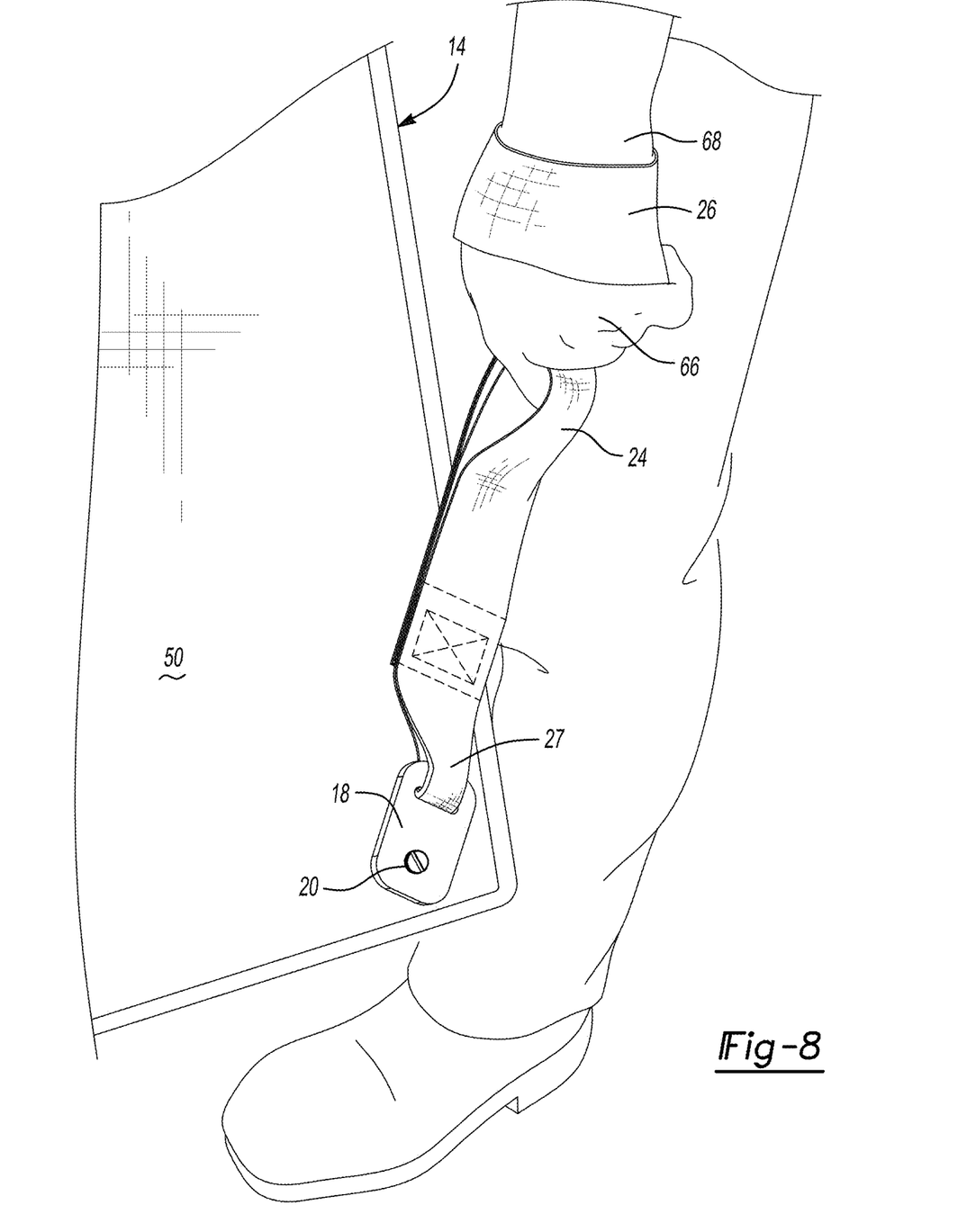
FIG. 8 is a partial perspective view of one of the people lifting the furniture item using the handling strap assembly.

With the handling strap assemblies 10 attached to the furniture item 14, one of the people 12 can insert his/her first hand 66 and (if desired) his/her first wrist 68 through a selected one of the handling loops 24, 26 of one of the handling strap assemblies 10, and another one of the people 12 can insert his/her first hand 66 and (if desired) his/her first wrist 68 through a selected one of the handling loops 24, 26 of another one of the handling strap assemblies 10. As shown in FIGS. 6 and 8, after inserting their first hands 66 (and optionally, their first wrists 68) through the selected handling loops 24, 26, the people 12 may engage the selected handling loop 24, 26 with their first wrists 68, first hands 66, or first forearm and grasp the strap 16 (at either or both of the handling loops 24, 26) with the first hands 66 (see step 130 of FIG. 10).

As shown in FIG. 7, the people 12 may also use their second hands 70 to hold parts of the furniture item 14 to stabilize the furniture item 14 while they grip the straps 16 with their first hands 66 (and optionally their first wrists 68) inserted through the selected handling loops 24, 26 (see step 140 of FIG. 10). For example, the people 12 may hold a backrest frame 72, armrest 74 and/or any other convenient part of the furniture item 14 with their second hands 70. It will be appreciated that the steps 130 and 140 need not necessarily be performed in the order indicated in FIG. 10. That is, step 140 could be performed before, after, or concurrently with step 130.

While holding the furniture item 14 as described above with respect to steps 130, 140, the people 12 may stand upright to lift the furniture item 14 up off the floor and walk with the furniture item 14 to a desired location (see step 150 of FIG. 10). Once the people 12 have transported the furniture item 14 to the desired location, the people 12 can lower the furniture item 14 back onto the floor and remove their hands 66, 70 from the handling loops 24, 26 and the furniture item 14. The handling strap assemblies 10 can then be removed from the furniture item 14 (e.g., by unscrewing the fasteners 20 from the apertures 56), and the feet 52 can be attached back onto the furniture item 14 (e.g., by screwing the feet 52 back into the aperture 56).

The handling strap assembly 10 described above allows for easier lifting and carrying of large and/or heavy furniture items. The two handling loops 24, 26 allow the same handling strap assembly 10 to be used to lift and carry a wider variety of furniture items (i.e., various shapes and sizes of furniture items). The two handling loops 24, 26 also allow different people of different sizes/heights/strengths to choose the handling loop 24, 26 that works best for them for a particular size/shape of furniture item. As shown in the figures, the people 12 do not need any tools or equipment (other than the handling strap assemblies 10) to perform the method described above.

Furthermore, the method described above including inserting a first hand through one of the handling loops 24, 26 and gripping the strap 16 with the first hand and using a second hand to hold a part of the furniture item 14 allows the people 12 to more easily stabilize and balance the furniture item 14 while the people 12 are carrying the furniture item 14. This may be especially beneficial for furniture items (e.g., sofas, loveseats, and chairs) that have centers of gravity that are not coincident with or nearly coincident with their geometrical centers.

Furthermore, utilizing the thumb screws as the fasteners 20 allows the people 12 to attach the handling strap assemblies 10 to the furniture item 14 without the use of any tools. Furthermore, by attaching the handling strap assemblies 10 to the furniture item 14 using the fasteners 20 and apertures 56 (i.e., the apertures 56 used to mount the feet 52), the furniture item 14 need not incorporate any features that are not already common in furniture in order to utilize the handling strap assemblies 10.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

What is claimed is:

1. A furniture handling strap assembly comprising:
   a strap including a first handling loop and a second handling loop, wherein the first and second handling loops are flexible;
   a bracket attached to the strap; and
   a fastener configured to be received through an aperture in the bracket,
   wherein:
      the second handling loop extends further away from the bracket than the first handling loop,
      the first and second handling loops extend parallel to each other,
      the strap includes a bracket loop attached to the bracket,
      the strap is a single, continuous length of material that is folded into a plurality of layers to form the first handling loop, the second handling loop, and the bracket loop, wherein the plurality of layers includes a first layer, a second layer, a third layer, a fourth layer, and a fifth layer,
      the first layer and second layer define the second handling loop,
      the third layer and the fifth layer define the first handling loop,
      the fourth layer and the fifth layer that define the bracket loop,
      the plurality of layers are stacked on top of each other and secured in a stack by a stitching,
      the first and second handling loops both extend from the stitching in a first direction, and
      the bracket loop extends from the stitching in a second direction that is opposite the first direction.

2. The furniture handling strap assembly of claim 1, wherein the fastener includes a head and a threaded shaft, and wherein the threaded shaft is configured to threadably engage a threaded aperture in a furniture item.

3. The furniture handling strap assembly of claim 2, wherein the strap is a webbing of thread.

4. The furniture handling strap assembly of claim 3, wherein the thread is a polyester thread.

5. The furniture handling strap assembly of claim 3, wherein the bracket is a rigid member including a slot that receives the bracket loop of the strap.

6. A method of transporting a furniture item, the method comprising:
   removing a first foot and a second foot from a first location and a second location, respectively, of an underside of the furniture item;

attaching a first handling strap assembly to the first location of the underside of the furniture item;

attaching a second handling strap assembly to the second location of the underside of the furniture item;

inserting a first hand of a first person through a selected one of first and second handling loops of the first handling strap assembly;

inserting a first hand of a second person through a selected one of first and second handling loops of the second handling strap assembly;

supporting the furniture item with a second hand of the first person, wherein the second hand of the first person is spaced apart from the first and second handling strap assemblies while supporting the furniture item;

supporting the furniture item with a second hand of the second person, wherein the second hand of the second person is spaced apart from the first and second handling strap assemblies while supporting the furniture item; and lifting the furniture item and carrying the furniture item.

7. The method of claim 6, wherein removing the first and second feet from the furniture item includes unscrewing the first and second feet from apertures in the furniture item.

8. The method of claim 7, wherein attaching the first and second handling strap assemblies to the first and second locations includes threadably engaging fasteners of the first and second handling strap assemblies into the apertures at the first and second locations of the furniture item.

9. The method of claim 8, wherein the first and second handling strap assemblies each include a bracket through which the fasteners extend, and wherein the second handling loop extends further away from the bracket than the first handling loop.

10. The method of claim 9, wherein the first and second handling loops extend parallel to each other.

11. The method of claim 10, wherein the first and second handling loops are formed from a webbing of thread.

12. The method of claim 11, wherein the thread is a polyester thread.

13. The method of claim 12, wherein the first and second handling loops are formed from a single, unitary length of the webbing of thread.

14. The method of claim 13, wherein:

the first and second handling loops are attached to each other by a stitching, the first and second handling loops both extend from the stitching in a first direction, the webbing of thread includes a bracket loop that extends from the stitching in a second direction that is opposite the first direction, and the bracket loop engages the bracket.

* * * * *